(12) United States Patent
Gallagher (10) Patent No.: US 7,374,838 B2
(45) Date of Patent: May 20, 2008

(54) ELECTROCHEMICAL FUEL CELL WITH FLUID DISTRIBUTION LAYER HAVING NON-UNIFORM PERMEABILITY

(75) Inventor: Emerson R. Gallagher, Vancouver (CA)

(73) Assignee: Ballard Power Systems Inc., Burnaby, BC (CA)

( * ) Notice: Subject to any disclaimer, the term of this patent is extended or adjusted under 35 U.S.C. 154(b) by 587 days.

(21) Appl. No.: 10/458,760

(22) Filed: Jun. 10, 2003

(65) Prior Publication Data

US 2004/0253504 A1 Dec. 16, 2004

(51) Int. Cl.
*H01M 4/00* (2006.01)
(52) U.S. Cl. .......................................... 429/44; 429/40
(58) Field of Classification Search .................. 429/44, 429/40
See application file for complete search history.

(56) References Cited

U.S. PATENT DOCUMENTS

| 5,318,863 | A | * | 6/1994 | Dhar ............................ 429/30 |
| 5,470,671 | A | * | 11/1995 | Fletcher et al. ................ 429/26 |
| 5,783,325 | A | * | 7/1998 | Cabasso et al. ............... 429/42 |
| 5,804,326 | A | * | 9/1998 | Chow et al. ................... 429/26 |
| 5,840,438 | A | | 11/1998 | Johnson et al. ............... 429/30 |
| 5,976,726 | A | | 11/1999 | Wilkinson et al. ............ 429/35 |
| 6,451,470 | B1 | | 9/2002 | Koschany et al. ............. 429/40 |
| 6,521,369 | B1 | | 2/2003 | Mercuri et al. ................ 429/40 |
| 6,756,149 | B2 | * | 6/2004 | Knights et al. ................ 429/38 |
| 6,884,745 | B2 | * | 4/2005 | Yazici et al. .................. 502/101 |
| 2002/0064702 | A1 | * | 5/2002 | Gibb ............................. 429/34 |
| 2003/0039876 | A1 | * | 2/2003 | Knights et al. ................ 429/30 |
| 2003/0082435 | A1 | | 5/2003 | Muthuswamy et al. ....... 429/44 |
| 2004/0086775 | A1 | * | 5/2004 | Lloyd et al. ................... 429/44 |

FOREIGN PATENT DOCUMENTS

| CA | 2342825 | 3/2000 |
| JP | 2040862 | 2/1990 |
| JP | 2001-135326 | 5/2001 |
| WO | WO 98/50973 | * 11/1998 |
| WO | WO 00/10209 | 2/2000 |
| WO | WO 00/31813 | 6/2000 |

* cited by examiner

*Primary Examiner*—Gregg Cantelmo
*Assistant Examiner*—Eugenia Wang
(74) *Attorney, Agent, or Firm*—Seed IP Law Group PLLC (57) ABSTRACT

An electrochemical fuel cell comprises an anode electrocatalyst layer, a cathode electrocatalyst layer, a polymer electrolyte membrane interposed between the anode and cathode electrocatalyst layers, an anode flow field plate, a cathode flow field plate, an anode fluid distribution layer interposed between the anode flow field plate and the anode electrocatalyst layer, and a cathode fluid distribution layer interposed between the cathode flow field plate and the cathode electrocatalyst layer, wherein at least one of the anode and cathode fluid distribution layers decreases in permeability from an inlet to an outlet of the electrochemical fuel cell. Methods for making a substantially fluid impermeable sheet material having a non-uniform pattern of perforations are also provided.

13 Claims, 6 Drawing Sheets

ELECTROCHEMICAL FUEL CELL WITH FLUID DISTRIBUTION LAYER HAVING NON-UNIFORM PERMEABILITY

BACKGROUND OF THE INVENTION

1. Field of the Invention

This invention relates generally to electrochemical fuel cells. More specifically, the present invention relates to an electrochemical fuel cell which has at least one fluid distribution layer which decreases in permeability from an inlet to an outlet of the fuel cell.

2. Description of the Related Art

Electrochemical fuel cells convert reactants namely, fuel and oxidant fluid streams, to generate electric power and reaction products. Solid polymer fuel cells typically employ a membrane electrode assembly ("MEA") consisting of a solid polymer electrolyte or ion exchange membrane ("PEM") disposed between two electrode layers comprising electrocatalysts, namely a cathode and an anode. The membrane, in addition to being an ion conductive (typically proton conductive) material, also acts as a barrier for isolating the reactant streams from each other. The MEA also typically includes fluid diffusion layers adjacent to the electrode layers for purposes of distributing reactants evenly to the electrodes.

At the anode, the fuel stream moves through the porous anode diffusion layer and is oxidized at the anode electrocatalyst layer. At the cathode, the oxidant stream moves through the porous cathode diffusion layer and is reduced at the cathode electrocatalyst layer to form a reaction product. The location of the electrocatalyst generally defines the electrochemically active layer.

In electrochemical fuel cells, the MEA is typically interposed between two substantially fluid impermeable separator plates (anode and cathode plates). The plates typically act as current collectors and provide support to the MEA. The plates may have reactant channels formed therein and act as flow field plates providing access of the fuel and oxidant to the porous anode and cathode diffusion layers, respectively, and providing for the removal of product water formed during operation of the cells.

Water management issues are critical in PEM fuel cell operation and humidification of the membrane is required to maintain optimal performance. As the water content of the membrane falls, it loses the ability to transport protons, its electrical resistance increases, fuel cell performance decreases and membrane failure may occur. To ensure adequate humidification of the membrane, one or both of the reactant streams supplied to the fuel cell stack are typically humidified. Such humidification is commonly provided by an external humidification system, however, such external systems increase the cost, complexity and size of the fuel cell system.

U.S. Pat. No. 6,451,470 and Canadian Patent Application No. 2,342,825 disclose the use of gas diffusion electrodes (each comprising a "gas diffusion barrier" or "GDB"), having a gas permeability gradient perpendicular to the membrane, rather than, or in addition to, uniformly porous anode and cathode substrates (each a "gas diffusion layer" or "GDL"), to inhibit the diffusion of water away from the membrane. The use of such gas diffusion electrodes enables fuel cell operation without external humidification of the reactants.

Additionally, the conditions in an operating PEM fuel cell vary significantly across the electrochemically active area of each electrode. For example, in a conventional fuel cell, as the oxidant is consumed, water is produced, the total gas pressure normally decreases and the oxidant partial pressure decreases. This results in a greater current density in the first third to half of the cell as compared to the latter half of the cell. Performance of the cell is likely limited by the high current density region, thereby resulting in an overall voltage lower than what would be obtained if the current density were uniformly distributed across the cell. High current density may also result in increased local temperatures that tend to lead to greater material degradation. Higher temperatures may also result in a decrease in the humidity at the inlet which can increase the likelihood of transfer leaks developing across the membrane and cause a loss of performance. This latter effect can be exacerbated if there is little or no humidification of the inlet reactant streams. While the inlet portion of the cell is likely to be too dry, the outlet portion of the cell is likely to have too much water which can result in localized flooding, uneven performance and increased mass transport losses. Thus, the requirements and desired properties of the fuel cell electrode will vary across the fuel cell.

U.S. Pat. No. 5,840,438, which is incorporated herein by reference, discloses the performance benefits of increasing the fluid permeability of a fuel cell electrode substrate between a reactant inlet and outlet, thereby facilitating the removal of product water. U.S. Patent Application No. US 2003/0039876 and Japanese Publication No. 2001-135326 also disclose an electrode substrate having a permeability gradient which increases from the fuel cell inlet to outlet.

Similarly, International Publication No. WO 00/31813 discloses the use of an additional perforated plate interposed between a separator plate and an adjacent porous fluid distribution layer, wherein the perforations in the additional plate increase in size between the inlet and outlet.

Although there have been advances in the field, there remains a need for fuel cell systems which are able to manage the accumulation of product water and maintain the level of humidification necessary for optimal performance. The present invention addresses these needs and provides further related advantages.

BRIEF SUMMARY OF THE INVENTION

In brief, the present invention relates to an electrochemical fuel cell which has at least one fluid distribution layer which decreases in permeability from an inlet to an outlet of the fuel cell.

In one embodiment, an electrochemical fuel cell is provided that comprises an anode electrocatalyst layer, a cathode electrocatalyst layer, a polymer electrolyte membrane interposed between the anode and cathode electrocatalyst layers, an anode flow field plate, a cathode flow field plate, an anode fluid distribution layer interposed between the anode flow field plate and the anode electrocatalyst layer, and a cathode fluid distribution layer interposed between the cathode flow field plate and the cathode electrocatalyst layer, wherein at least one of the anode and cathode fluid distribution layers decreases in permeability from an inlet to an outlet of the electrochemical fuel cell.

Methods for making a substantially fluid impermeable sheet material having a non-uniform pattern of perforations are also disclosed.

These and other aspects of the invention will be apparent upon reference to the attached figures and following detailed description.

DETAILED DESCRIPTION OF THE INVENTION

Gas diffusion barrier electrode structures can serve an important role in maintaining adequate membrane hydration and in controlling water distribution generally in PEM fuel cells. As shown by the following model, such gas diffusion barriers may be utilized to maintain hydration of the membrane in combined oxidant-coolant fuel cells. As used herein, "combined oxidant-coolant fuel cell" refers to a fuel cell in which the oxidant also acts as the coolant and in which the oxidant flow field also serves as a coolant channel. In such a fuel cell, the oxidant is typically supplied at high stoichiometries to produce the desired amount of cooling. Furthermore, such gas diffusion barriers may also be utilized to maintain hydration of the membrane in unhumidified fuel cells (i.e., fuel cells in which the reactant streams supplied to the fuel cell stack are not humidified).

According to a one-dimensional model for a fuel cell cathode, the mass fractions of water vapor ($mH_2O$) and oxygen ($mO_2$) can be evaluated at three points, namely, (1) in the gas phase adjacent to the catalyst layer ($m_1H_2O$ and $m_1O_2$, respectively), (2) at the GDB/air stream interface ($m_2H_2O$ and $m_2O_2$, respectively), and (3) in the air stream ($m_3H_2O$ and $m_3O_2$, respectively). This is further illustrated by FIG. 1, which shows the three points 1, 2 and 3 in relation to the membrane 14, catalyst layer 21, GDB 31, cathode flow field plate 24 and general direction of the air stream flow 50.

Figure 1:
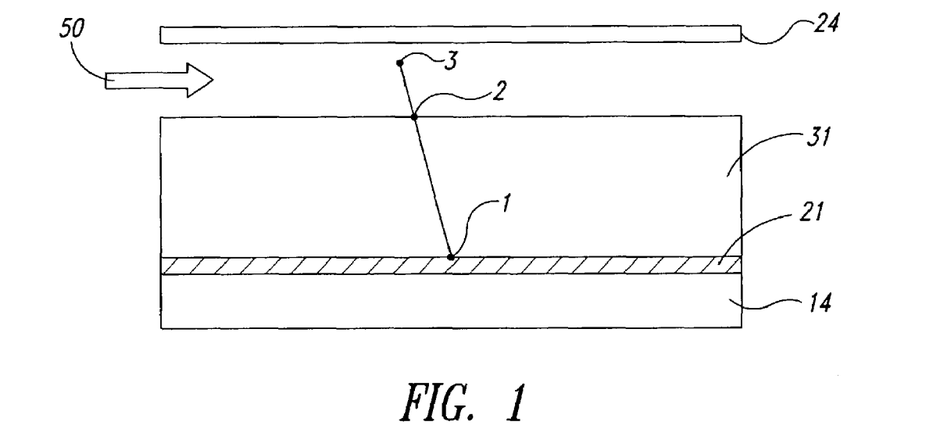
FIG. 1 shows the three points at which the mass fractions of water vapor and oxygen may be evaluated according to the mathematical model described herein.

Assuming: a uniform, known current density; a uniform, known cell temperature at the GDB/membrane interface; mass transport by diffusion only within the GDB; a homogeneous GDB with a known effective diffusivity constant for water vapor, $D_{effH2Oair}$, and oxygen, $D_{effO2air}$; and a high air stoichiometry, such that $m_2H_2O \cong m_3H_2O$ and $m_2O_2 \cong m_3O_2$, the following equations may be used to evaluate $m_1H_2O$, $m_1O_2$, $m_2H_2O$ and $m_2O_2$.

$$\Phi_{H_2O} = \frac{\rho D_{effH_2Oair}(m_1H_2O - m_2H_2O)}{t}$$

$$\Phi_{O_2} = \frac{\rho D_{effO_2air}(m_2O_2 - m_1O_2)}{t}$$

Equations 1 wherein, $\Phi$ is water mass flux through the GDB (kg/m²s), $\rho$ is the density of air and t is the thickness of the GDB.

$$\Phi_{H_2O} = \frac{i \cdot M_{H_2O}}{2 \cdot e \cdot N_A}$$

$$\Phi_{O_2} = \frac{i \cdot M_{O_2}}{4 \cdot e \cdot N_A}$$

Equations 2 wherein, i is the current density, $M_{H2O}$, $M_{O2}$ are molecular weights, e is the electron charge and $N_A$ is Avogadro's number.

Equations 1 and Equations 2 can be combined to give the following Equations 3, which show the relationship between $m_1H_2O$, $m_1O_2$, t, i and diffusivity.

$$m_1H_2O = m_2H_2O + \frac{t}{\rho D_{effH_2Oair}}\left[\frac{i \cdot M_{H_2O}}{2 \cdot e \cdot N_A}\right]$$

$$m_1O_2 = m_2O_2 - \frac{t}{\rho D_{effO_2air}}\left[\frac{i \cdot M_{O_2}}{4 \cdot e \cdot N_A}\right]$$

Equations 3

With the further assumption that:

$$D_{effH2Oair} = D_{H2Oair} \cdot P^{1.5}$$

$$D_{effO2air} = D_{O2air} \cdot P^{1.5}$$

wherein P is the porosity as void volume fraction, Equations 3 show the mass fractions of water vapor and oxygen as a function of GDB porosity. The mass fraction of oxygen at the catalyst layer decreases as GDB porosity decreases, to the point where it reaches zero, after which current can no longer be sustained. The mass fraction of water vapor at the catalyst layer increases as GDB porosity decreases, until saturation is reached, at which point electrode flooding will occur.

Figure 2:
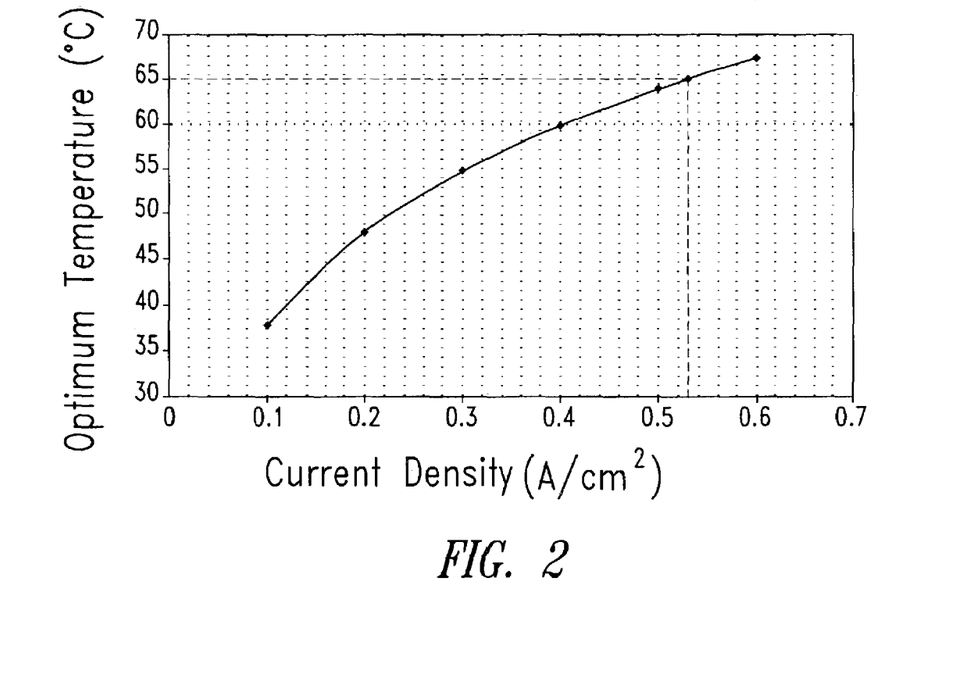
FIG. 2 is a graph showing the relationship between the temperature required to maintain saturation and the current density.

As shown by Equations 3, the mass fractions of water vapor and oxygen are also a function of the current density. Furthermore, the point at which saturation will occur depends on the temperature of the fuel cell. Accordingly, for a given GDB thickness and porosity, and for any given current density, there will be a fuel cell temperature which corresponds to complete membrane hydration (i.e., saturation or an RH of 100%). This relationship is given by the following Equation 4 and is shown in FIG. 2. As illustrated in FIG. 2, the optimum temperature is 65° C. for a fuel cell operating at 0.53 A/cm². Furthermore, this relationship may be generalized to apply to any desired target RH.

$$T_{opt} = T_{satm}\left[m_2H_2O + \frac{t}{\rho D_{effH_2Oair}}\left[\frac{i \cdot M_{H_2O}}{2 \cdot e \cdot N_A}\right]\right] \quad \text{Equation 4}$$

wherein $T_{satm}$ is the saturation temperature corresponding to a given water vapor mass fraction, evaluated at the cell pressure (1 atm absolute here).

It is also useful to consider an overall mass transport coefficient ($K_{overall}$), which includes all different means for mass transport within the GDB, such as gas convection, gas diffusion and liquid water wicking. In terms of $K_{overall}$, Equation 1 becomes:

$$\Phi_{H2O} = K_{overall} \cdot \Delta m$$

(wherein $\Delta m$ is the difference between the water vapor mass fractions), and, assuming gas diffusion is the only, or the dominant mechanism for mass transport within the GDB:

$$K_{Overall} = \frac{\rho D_{effH_2Oair}}{t}$$

For a fuel cell operating with complete membrane hydration (i.e., saturation condition), the foregoing equations may be written as:

$$\Phi_{H2O} = K_{overall} \cdot \Delta m = K_{overall} \cdot (msat[T_{membrane}] - mH_2O_{ambient})$$

and the temperature for saturation at the membrane can be expressed in terms of i and $K_{overall}$ as follows:

$$T_{opt} = T_{satm}\left[\frac{\Phi_{H_2O}}{K_{overall}} + mH_2O_{ambient}\right] \quad \text{Equation 5}$$

$$= T_{satm}\left[\frac{i \cdot M_{H_2O}}{2 \cdot e \cdot N_A \cdot K_{overall}} + mH_2O_{ambient}\right]$$

However, in a combined oxidant-coolant fuel cell, the local cell temperature increases in the direction of the oxidant/coolant flow. Often the temperature variation along the length of the oxidant/coolant channel can be significant, i.e., in the range of 5 to 20° C. Accordingly, it is not possible to maintain a desired hydration level by means of a GDB having a uniform porosity. While such a GDB will maintain a uniform mass fraction of water vapor at the catalyst layer, the desired hydration level also depends upon the local cell temperature. As a result, a desired hydration level would only be maintained at one particular point along the oxidant/coolant flow channel (i.e., at one temperature).

However, it is possible to maintain a target hydration level by means of a GDB having a variable $K_{overall}$ value along the length of the oxidant/coolant channel. Equation 5 may be re-written in terms of the local $K_{overall}$ value required to maintain saturation as a function of the local cell temperature as follows:

$$K_{optimum,local} = \frac{\Phi_{H_2O}}{(msat[T_{local}] - mH_2O_{ambient})}$$

Figure 3:
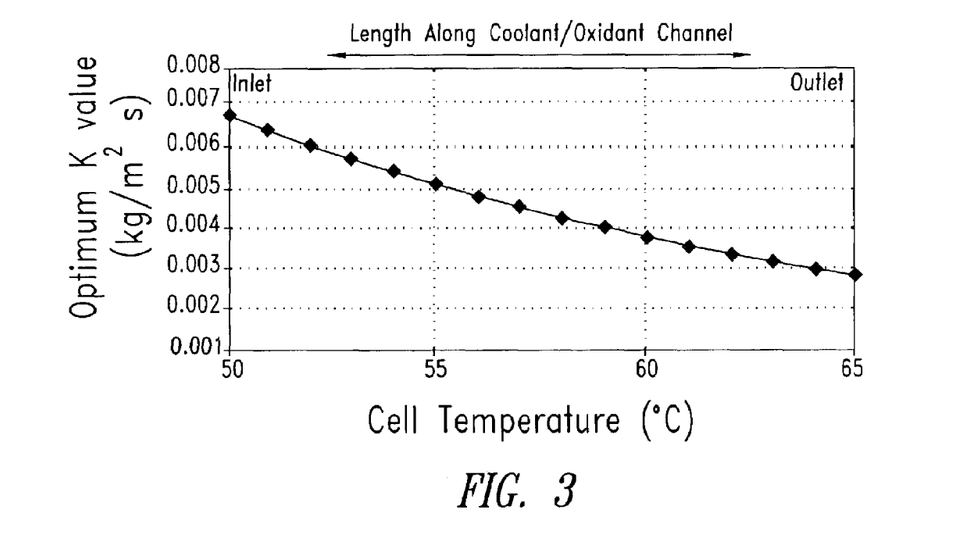
FIG. 3 is a graph showing the relationship between the optimum K value, required to maintain saturation, and the cell temperature for a combined oxidant-coolant fuel cell.

In this way, $K_{overall}$, which is directly proportional to porosity, must decrease along the length of the reactant flow channel in order to maintain saturation. This relationship is further illustrated in FIG. 3, which shows the relationship between $K_{optimum,local}$, required to maintain saturation, versus the cell temperature for a combined oxidant-coolant fuel cell operating at a current density of 0.53 A/cm².

Figure 4:
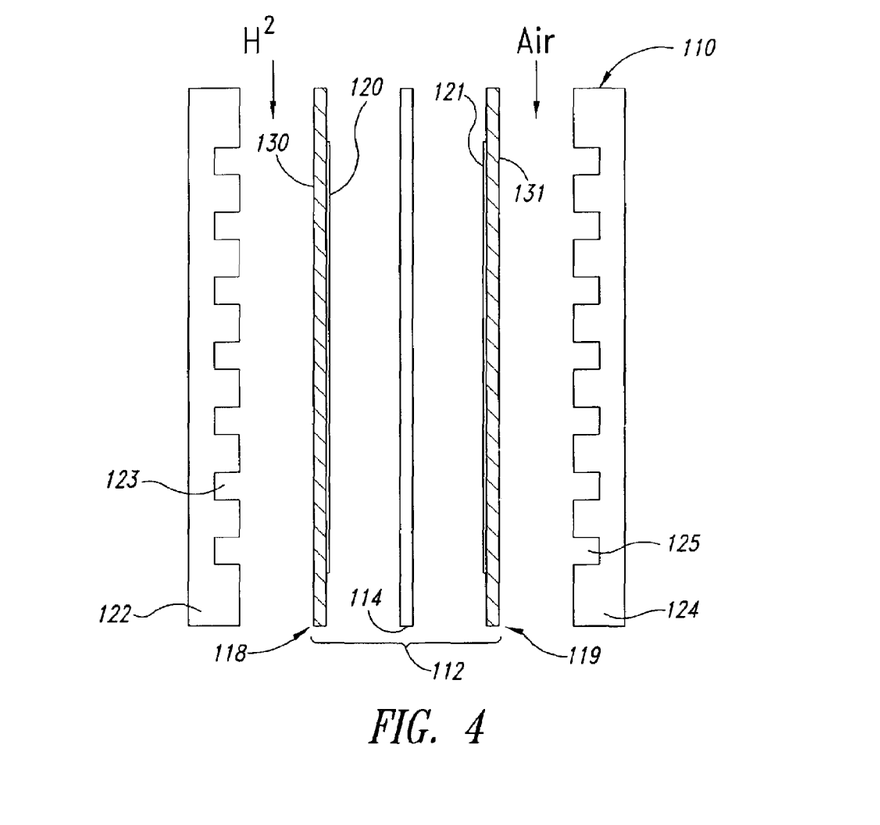
FIG. 4 is an exploded sectional view of an electrochemical fuel cell.

FIG. 4 illustrates a fuel cell 110. Fuel cell 110 includes a membrane electrode assembly 112 interposed between anode flow field plate 122 and cathode flow field plate 124. Membrane electrode assembly 112 consists of a polymer electrolyte membrane 114 interposed between two electrodes, namely, anode 118 and cathode 119. In conventional fuel cells, anode 118 and cathode 119 each comprise a gas diffusion layer (i.e., a fluid distribution layer of porous electrically conductive sheet material) 130 and 131, respectively. Each gas diffusion layer has a thin layer of electrocatalyst 120 and 121, such as platinum black or a carbon-supported platinum catalyst, disposed on the surface thereof at the interface with membrane 114 to render each electrode electrochemically active. In an alternate configuration, electrocatalyst layers 120 and 121 may be disposed on opposing surfaces of membrane 114 at the interfaces with gas diffusion layers 130 and 131, respectively. Anode flow field plate 122 has at least one fuel channel 123 formed in its surface facing anode gas diffusion layer 130. Cathode flow field plate 124 has at least one oxidant flow channel 125 formed in its surface facing cathode gas diffusion layer 131. When assembled against the cooperating surfaces of gas diffusion layers 130 and 131, channels 123 and 125 form reactant flow field passages for the fuel and oxidant, respectively, or the fuel and the oxidant/coolant, respectively, in a combined oxidant-coolant fuel cell.

In one embodiment of the present invention, fluid distribution layers 130 and 131 each comprise a gas diffusion barrier layer (i.e., a fluid distribution layer with reduced permeability) which decreases in permeability in the direction of the fuel and/or oxidant flow (i.e., from an inlet to an outlet of fuel cell 110).

Such gas diffusion barrier layers, having variable permeability, may be formed by introducing a filler material into a porous electrically conductive sheet material in a non-uniform manner. The filler material reduces the porosity of the sheet material by reducing the size of, or filling completely, the pores in the sheet material. To achieve the desired gradient in permeability, the sheet material may be impregnated with an increasing amount of the filler material in the direction of the fuel or oxidant flow. For example, little or no filler material may be introduced near the fuel cell inlet, whereas an amount of filler material sufficient to completely fill the pores may be introduced near the fuel cell outlet. It will be appreciated that suitable filling materials are those which can be introduced into the pores of the sheet material and remain substantially unchanged under the operating conditions of the fuel cell.

As described previously, in fuel cells which employ air or oxygen as the oxidant, product water is formed on the cathode side of the membrane. Accordingly, and as described by the mathematical model set forth above, it may be sufficient to employ a gas diffusion barrier layer on the cathode side only. The permeability gradient in the cathode GDB may desirably be set in accordance with the temperature gradient in the cell, such that an optimum $K_{overall}$ value is obtained over the length of the flow channel. While the above model generally suggests that a decreasing permeability gradient from inlet to outlet is desirable, in practice fuel cells may experience drying problems in the immediate vicinity of a reactant inlet. Thus, it may be advantageous to employ a greatly reduced GDB porosity just in the immediate vicinity of the inlet to mitigate a drying problem. In such a case then, the preferred GDB permeability might start relatively low in this problematic region immediately around the inlet, then increase significantly in the adjacent region still near the inlet, and then decrease over the rest of the length of the flow channel as per the model.

Although the preceding discussion is directed primarily at the use of a GDB with a permeability gradient on the cathode side of the fuel cell it will be appreciated that the use of such a GDB is applicable for purposes of controlling water distribution at both the cathode and the anode sides (e.g., as shown in FIG. 4).

Figure 5:
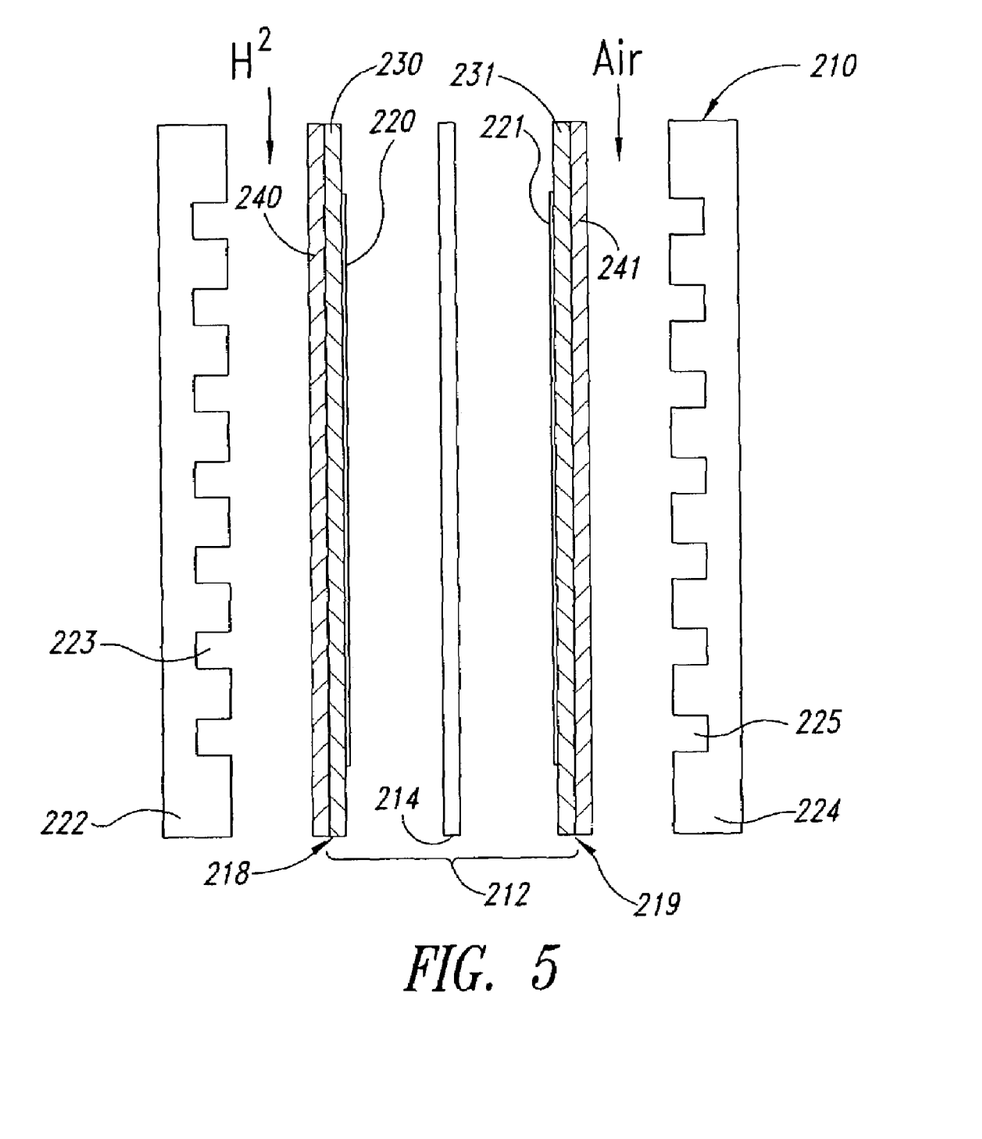
FIG. 5 is an exploded sectional view of an electrochemical fuel cell having a pair of gas diffusion layers and a pair of gas diffusion barrier layers.

In another embodiment, shown in FIG. 5, rather than employing a gas diffusion barrier layer instead of a gas diffusion layer, the anode and cathode fluid distribution layers each comprise both a gas diffusion layer and a gas diffusion barrier layer. FIG. 5 illustrates a fuel cell 210 comprising both gas diffusion layers 230 and 231 and gas diffusion barrier layers 240 and 241. Similar to fuel cell 110 of FIG. 4, fuel cell 210 includes a membrane electrode assembly 212, including a polymer electrolyte membrane 214 interposed between an anode 218 and a cathode 219, each of which further comprise gas diffusion layers 230 and 231, respectively, and gas diffusion barrier layers 240 and 241, respectively. As in FIG. 4, each fluid distribution layer has a thin layer of electrocatalyst 220 and 221 at the interface between the fluid distribution layer and membrane 214 and membrane electrode assembly 212 is interposed between anode flow field plate 222, having fuel channels 223, and cathode flow field plate 224, having oxidant channels 225.

Gas diffusion barrier layers 240 and 241 each have a gradient in permeability and decrease in the direction of the fuel and/or oxidant flow (i.e., from an inlet to an outlet of fuel cell 210.

In yet a further embodiment, instead of employing a gas diffusion layer and/or a gas diffusion barrier layer as described above, the fluid distribution layer may be composed of a substantially fluid impermeable sheet material which is rendered fluid permeable, at least in the active region, by perforating the sheet material. Perforating the sheet material permits the passage of reactant fluid between the two major planar surfaces thereof and to the electrocatalyst layer. In this way, a fluid distribution layer having reduced permeability (i.e., a gas diffusion barrier layer) will be produced. U.S. Pat. No. 5,976,726 and U.S. Patent Application No. US 2003/0039876, each of which is hereby incorporated by reference, disclose the use of such a substantially fluid impermeable sheet material.

Figure 6:
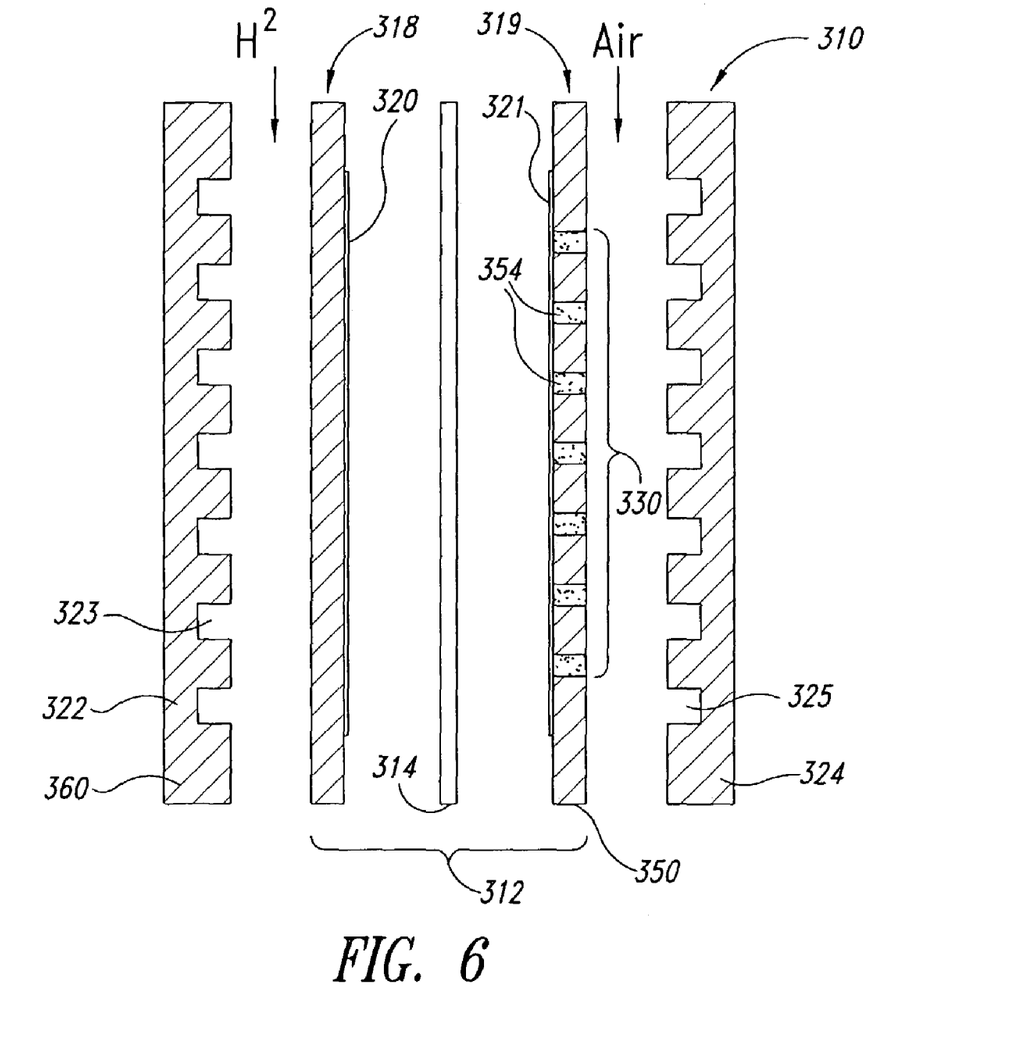
FIG. 6 is an exploded sectional view of an electrochemical fuel cell having a pair of fluid distribution layers wherein one of the fluid distribution layers comprises a substantially fluid impermeable sheet material having a plurality of perforations formed in the electrochemically active region thereof.

FIG. 6 is an exploded sectional view of a fuel cell 310 having such a fluid distribution layer comprising a perforated substantially fluid impermeable material. Fuel cell 310 includes a membrane electrode assembly 312, including a polymer electrolyte membrane 314 interposed between an anode fluid distribution layer 318 and a cathode fluid distribution layer 319, each having a quantity of electrocatalyst disposed in a layer 320 and 321, respectively, at the interface with membrane 314 in the electrochemically active region 330. Membrane electrode assembly 312 is interposed between an anode flow field plate 322 and a cathode flow field plate 324, each plate having open-faced channels 323 and 325, respectively, facing the corresponding fluid distribution layers 318 and 319.

In the embodiment shown in FIG. 6, fluid distribution layer 319 comprises a substantially fluid impermeable sheet material 350 that is perforated at least in the electrochemically active region 330. Perforations 354 render the fluid distribution layer fluid permeable at least in the through-plane direction. In further embodiments, perforations 354 may contain a filler material, such as particulate carbon or hydrophilic or hydrophobic materials, which do not completely block the perforations to passage of reactant. Although not shown in FIG. 6, it is understood that fluid distribution layer 318 may similarly comprise a perforated substantially fluid impermeable sheet material 350.

According to the present invention, the pattern of perforations 354 is not uniform across the fluid distribution layer. In this way, the electrochemical reaction rate and fluid transport properties can be controlled by varying the perforation distribution, number, size, shape or any combination thereof across the active region. The fuel cell can thus be designed for improved current density distribution and appropriate humidity across the membrane according to the mathematical model described previously.

Figure 7A:
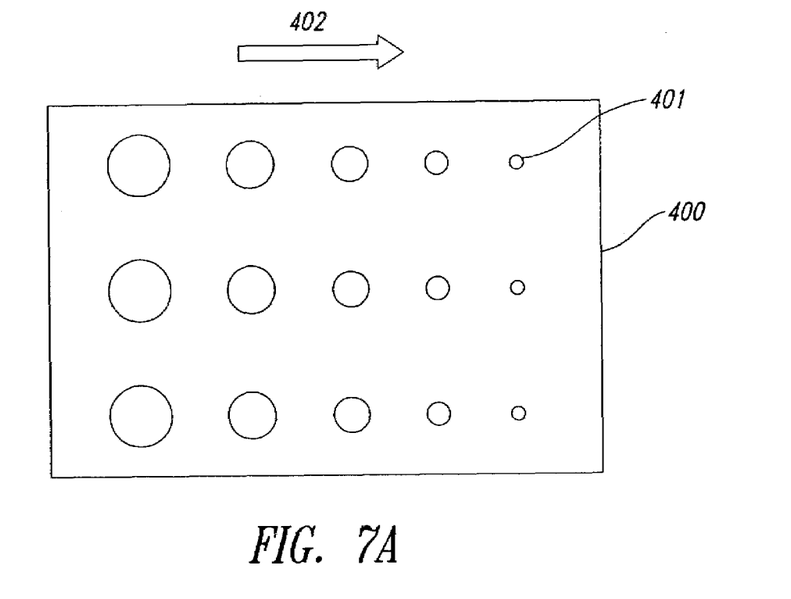
FIG. 7A is a plan view of a perforated fluid distribution layer wherein the perforations decrease in size in a graded manner along the flow field path from the inlet to the outlet.
Figure 7B:
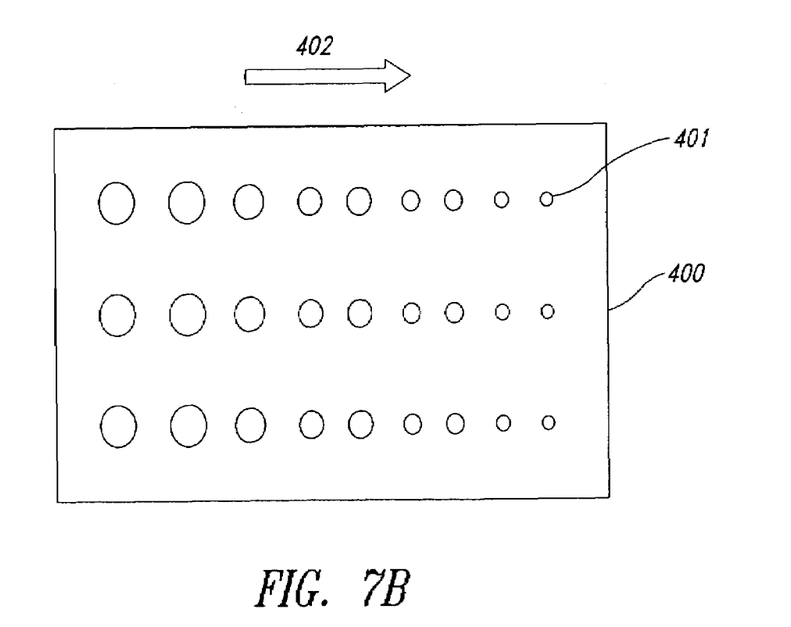
FIG. 7B is a plan view of a perforated fluid distribution layer wherein the perforations decrease in size in a banded manner along the flow field path from the inlet to the outlet.

FIG. 7A illustrates one embodiment of such a perforated fluid distribution layer 400 wherein the perforations 401 decrease in size in a graded manner (i.e., each perforation is progressively smaller than the foregoing perforation) as layer 400 is traversed in-plane along the reactant flow path from an inlet to an outlet of the fuel cell. The arrow 402 shows the general direction of reactant flow. FIG. 7B illustrates an alternate embodiment in which perforations 401 decrease in size in a banded manner (i.e., rather than progressively decreasing in size from one perforation to the next, a number of perforations of the same size are followed by a number of perforations of a smaller size). In other embodiments, not shown, the density (i.e., the number of perforations per unit area) of perforations 401 decrease in either a graded or banded manner as layer 400 is traversed in-plane along the reactant flow path. In yet a further embodiment, also not shown, both the size and density of the perforations in the fluid distribution layer increase along the reactant flow path from the inlet to the outlet in either a graded or banded manner.

While FIGS. 7A and 7B show perforations 401 as being substantially cylindrical, it is understood that other shapes may be used and that the shape can be varied along the flow path in addition to the size and/or density of the perforations. This may include, for example, varying the perforations in the through-plane direction along the flow path. Furthermore, if the reactant flow path is substantially linear between the inlet and the outlet, then the patterns of the perforations used for the fluid distribution layers may also be linear, as illustrated in FIGS. 7A and 7B. However, if the reactant flow path follows, for example, a serpentine path from the inlet to the outlet, it may be desirable to vary the perforations along a similar serpentine path on the fluid distribution layer.

The substantially fluid impermeable sheet material 350 of FIG. 6 is preferably formed from an electrically conductive material such as flexible graphite, carbon resin or a metal and may further comprise a filler material within the perforations in the active region. Preferably, flexible graphite, also known as graphite foil, exfoliated graphite and expanded graphite, is used. U.S. Pat. No. 6,521,369 discloses a method for forming a uniform pattern of perforations in such a material by the mechanical impact of a patterned roller (i.e., a roller having a number of protrusions capable of perforating the substantially fluid impermeable sheet material). According to the present invention, the method disclosed in U.S. Pat. No. 6,521,369 may be modified as set forth below to produce a non-uniform pattern of perforations and impart a decreasing gradient in permeability in the direction of the fuel and/or oxidant flow.

Figure 8A:
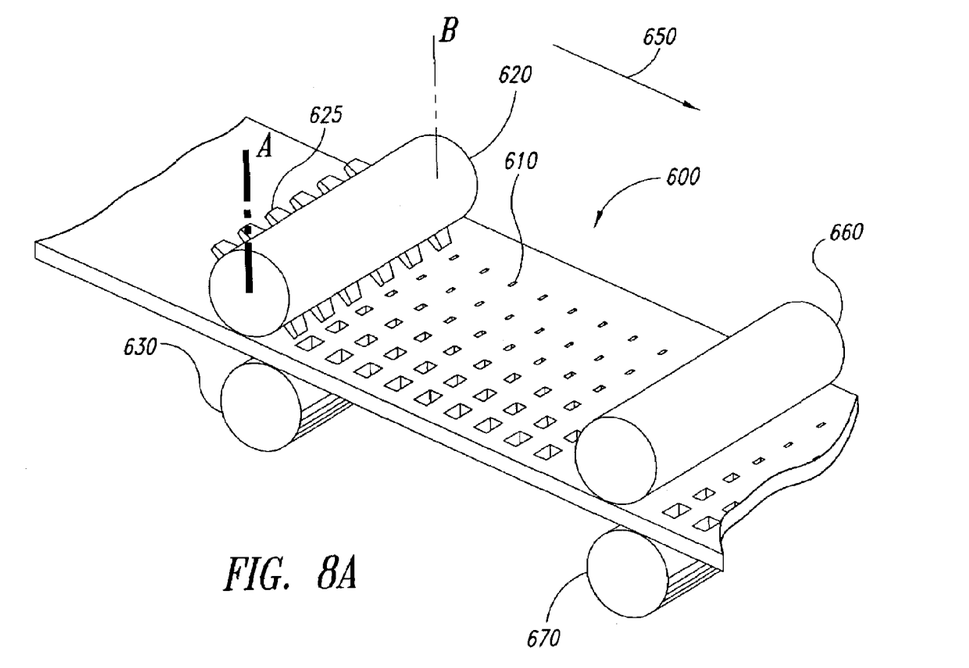
FIG. 8A illustrates a method of making a perforated fluid distribution layer wherein the perforations decrease in size along the flow field path from the inlet to the outlet.
Figure 8B:
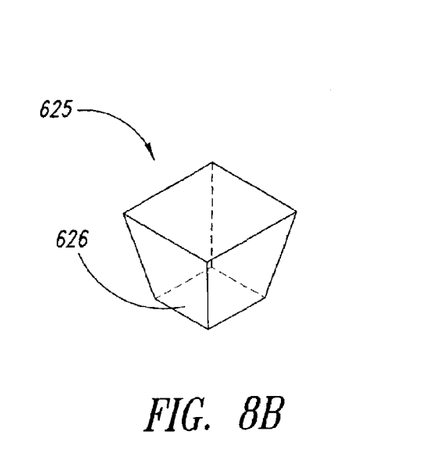
FIG. 8B shows a representative flat-ended protrusion element used in making the perforations in a perforated fluid distribution layer.

As shown in FIG. 8A, perforations 610 are formed in substantially fluid impermeable sheet material 600 at a number of locations by the mechanical impact of two pairs of rollers 620, 630 and 660, 670. Arrow 650 shows the general direction in which sheet material 600 is fed through the two pairs of rollers. Roller 630 has a number of protrusions 625 capable of perforating sheet material 600. Accordingly, when sheet material 600 is fed through the first pair of rollers 620, 630, protrusions 625 form perforations 610. FIG. 8B shows a representative protrusion 625 having a cross-section that decreases in the direction away from roller 620 and a flat end 626. Due to the decreasing cross-section of protrusions 625, the openings of perforations 610 are larger on the side of sheet material 600 that is initially impacted.

In order to form a non-uniform pattern of perforations, roller 620 is run with a pressure or displacement bias towards end A. As a result of this bias, the protrusions 625 towards end A will have a deeper impact than the protrusions 625 towards end B. Due to the decreasing cross-section of protrusions 625, this difference in impact from end A to end B produces a pattern of perforations 610 which decrease in size in a graded manner across the width of sheet material 600. In this way, the width of sheet material 600 will be equal to the length of the reactant flow channel. Furthermore, the surface of roller 630 may be deformable in order to accommodate the varying depth of the impact of protrusions 625.

As further shown in FIG. 8A, after being perforated by the first pair of rollers 620, 630, sheet material 600 is fed through the second pair of rollers 660, 670. The smooth surfaces of rollers 660, 670 are utilized to set the final thickness of sheet material 600 and ensure that there are no rough edges surrounding perforations 610.

In another embodiment, the amount of compression applied by ends A and B is equal and, in order to form a non-uniform pattern of perforations, the amount of compression applied is varied cyclically (by varying the roller pressure or displacement). As in the previous embodiment, when the compression applied by roller 620 is increased, protrusions 625 will have a deeper impact in sheet material 600 and, due to the decreasing cross-section of protrusions 625, will produce larger perforations 610. Accordingly, a pattern of perforations 610 which decrease in size in a graded manner across the length of sheet material 600 will be produced.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. An electrochemical fuel cell comprising:
 (a) an anode electrocatalyst layer;
 (b) a cathode electrocatalyst layer;
 (c) a polymer electrolyte membrane interposed between the anode and cathode electrocatalyst layers;
 (d) an anode flow field plate;
 (e) a cathode flow field plate;
 (f) an anode fluid distribution layer interposed between the anode flow field plate and the anode electrocatalyst layer; and
 (g) a cathode fluid distribution layer interposed between the cathode flow field plate and the cathode electrocatalyst layer,
 wherein at least one of the anode and cathode fluid distribution layers decreases in porosity from an inlet to an outlet of the electrochemical fuel cell, and wherein the electrochemical fuel cell is a combined oxidant-coolant fuel cell.

2. The electrochemical fuel cell of claim 1 wherein the at least one fluid distribution layer that decreases in porosity from an inlet to an outlet of the electrochemical fuel cell comprises a gas diffusion barrier layer having a gradient in porosity.

3. The electrochemical fuel cell of claim 1 wherein the at least one fluid distribution layer that decreases in porosity from an inlet to an outlet of the electrochemical fuel cell comprises:
 (a) a gas diffusion layer; and
 (b) a gas diffusion baffler layer having a gradient in porosity.

4. The electrochemical fuel cell of claim 1 wherein the at least one fluid distribution layer that decreases in porosity from an inlet to an outlet of the electrochemical fuel cell comprises a fluid impermeable sheet material having a plurality of perforations configured to impart a gradient in porosity to the fluid impermeable sheet material.

5. The electrochemical fuel cell of claim 4 wherein the fluid impermeable sheet material is flexible graphite.

6. The electrochemical fuel cell of claim 4 wherein the plurality of perforations decrease in size in a graded manner from the inlet to the outlet of the electrochemical fuel cell.

7. The electrochemical fuel cell of claim 4 wherein the plurality of perforations decrease in size in a banded manner from the inlet to the outlet of the electrochemical fuel cell.

8. The electrochemical fuel cell of claim 4 wherein the density of the plurality of perforations decreases in a graded manner from the inlet to the outlet of the electrochemical fuel cell.

9. The electrochemical fuel cell of claim 4 wherein the density of the plurality of perforations decreases in a banded manner from the inlet to the outlet of the electrochemical fuel cell.

10. The electrochemical fuel cell of claim 1 wherein the temperature of the fuel cell increases from an inlet to an outlet of the fuel cell.

11. The electrochemical fuel cell of claim 1 wherein the electrochemical fuel cell is an unhumidified fuel cell.

12. The electrochemical fuel cell of claim 1 wherein the at least one fluid distribution layer that decreases in porosity from an inlet to an outlet of the electrochemical fuel cell is the cathode fluid distribution layer.

13. A fuel cell stack comprising a plurality of the electrochemical fuel cell of claim 1.

* * * * *